(No Model.)

G. W. LARAWAY.
CAR BRAKE.

No. 246,156. Patented Aug. 23, 1881.

Witnesses.

Inventor
George W. Laraway.
by R. H. Eddy atty.

UNITED STATES PATENT OFFICE.

GEORGE W. LARAWAY, OF HARTFORD, CONNECTICUT.

CAR-BRAKE.

SPECIFICATION forming part of Letters Patent No. 246,156, dated August 23, 1881.

Application filed January 31, 1881. (No model.)

*To all whom it may concern:*

Be it known that I, GEORGE W. LARAWAY, of the city and county of Hartford, of the State of Connecticut, have invented a new and useful Improvement in Mechanism for Operating the Brakes of a Railway-Carriage; and I do hereby declare the same to be described in the following specification and represented in the accompanying drawings, of which—

Figure 1:
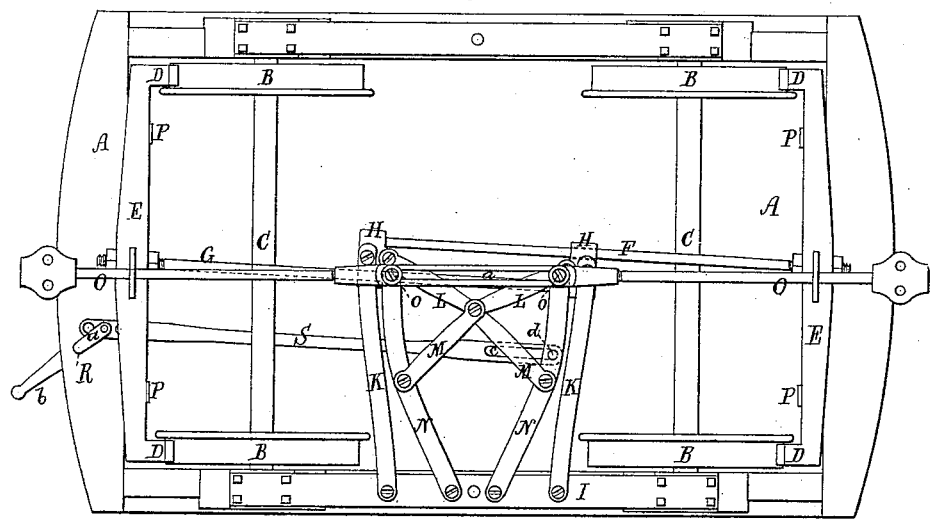
Figure 2:
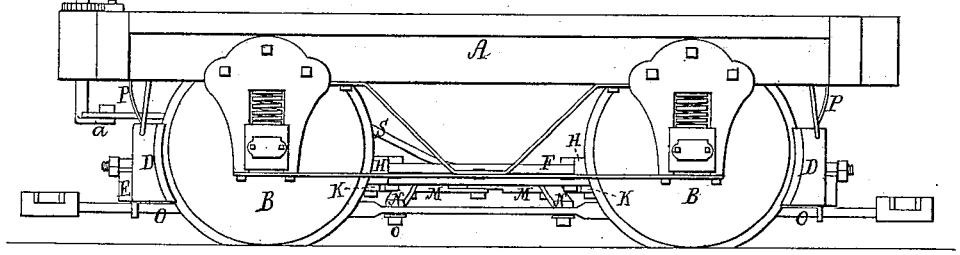
Figure 3:
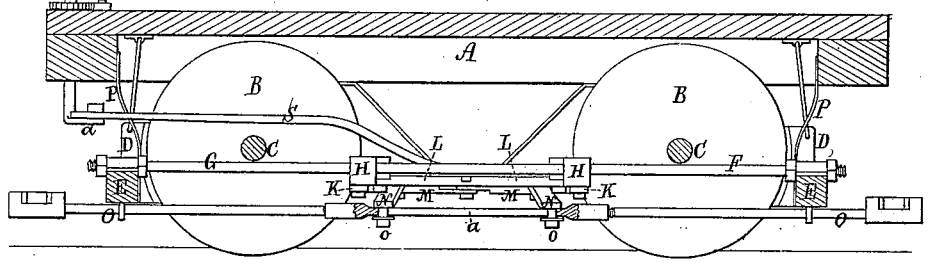

Figure 1 is an under-side view, Fig. 2 a side elevation, and Fig. 3 a longitudinal section, of a railway-car truck provided with my invention, the nature of which is defined in the claims as hereinafter made.

In the said drawings, A denotes the platform or truck; B B B B, its four wheels; C C, their axles; D, the brakes, and E E the support-bars of such brakes, all being arranged as represented.

From each of the support-bars E E there is extended inward, as shown, one of two rods, F G, each of which at its inner end is provided with a head, H, which is fixed to it and slides freely on the other of said bars, which passes directly through it. These heads have pivoted to them and the lower side bar, I, of the truck-frame two rods, K K, which serve to counteract the tendency of two toggles, L L, while being moved forward, to press the heads out of place laterally, such toggles being pivoted to each other and the two heads, and also at their junction to two pitmen, M M. These pitmen, arranged as shown, are pivoted at their outer ends to two levers, N N, which at their outer ends are fulcrumed to the bar I, and at their inner ends have studs or screws *o* extending from them into or through a long slot, *a*, in a draw-bar, O, adapted to slide lengthwise at the middle of the truck. On drawing the draw or slide bar O in either direction longitudinally, the brakes will be forced up to the tread of the wheels. The said bar should be provided with some proper means by which it may be connected with a like bar of a truck that may be in rear or in advance of the truck carrying such bar, such being in order that all the said bars of the trucks may be moved simultaneously to cause the brakes of the trucks to be put in operation at the same time relatively to their wheels. Springs P, applied to the truck-frame and the brake-bars, serve to move the latter so as to carry the brakes away from the wheels.

In case it may be desirable to operate the brakes of the truck without doing so by the slide-bar O, there is pivoted to the lever-crank *a* of a shaft, R, having two cranks, *a b*, a rod, S, which, near its inner end, has a slot, *c*, made in it (the said rod) to receive a stud, *d*, projecting from one of the two levers N N. The slot is to allow the connected lever to play or move independently of the rod S when such lever is worked or moved by the slide-bar O.

What I claim as my invention is as follows, viz:

1. The combination of the slotted draw-bar O and the two levers N N, applied to it and the truck-frame in manner as described, with the two pitmen M M, the toggles L L, and the slide-rods F G, adapted to each other and the brake-support bars, as explained, all being arranged and to operate essentially as set forth.

2. The combination of the slotted rod S with the double-cranked shaft R, the levers N N, pitmen M M, toggles L L, and slide-rods F G, adapted to each other and the brake-support bars, all being substantially as set forth.

3. The combination of the guide-rods K K with the slide-rods F G, toggles L L, pitmen M M, levers N N, and slotted draw-bar O, all being arranged and adapted to each other and the truck-frame and its brake-support bars, substantially as and to operate as set forth.

GEORGE W. LARAWAY.

Witnesses:
R. H. EDDY,
E. B. PRATT.